(12) United States Patent
Toda et al.

(10) Patent No.: US 11,262,181 B2
(45) Date of Patent: Mar. 1, 2022

(54) STRAIN GAUGE WITH INCREASED RESISTOR PROTECTION

(71) Applicant: MINEBEA MITSUMI Inc., Nagano (JP)

(72) Inventors: Shinya Toda, Shizuoka (JP); Toshiaki Asakawa, Shizuoka (JP); Shintaro Takata, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/042,412

(22) PCT Filed: Apr. 1, 2019

(86) PCT No.: PCT/JP2019/014479
§ 371 (c)(1),
(2) Date: Sep. 28, 2020

(87) PCT Pub. No.: WO2019/194129
PCT Pub. Date: Oct. 10, 2019

(65) Prior Publication Data
US 2021/0018307 A1    Jan. 21, 2021

(30) Foreign Application Priority Data
Apr. 3, 2018  (JP) .............................. JP2018-071762

(51) Int. Cl.
*G01B 7/16*    (2006.01)
(52) U.S. Cl.
CPC ...................................... *G01B 7/18* (2013.01)

(58) Field of Classification Search
None
See application file for complete search history.

(56) References Cited

U.S. PATENT DOCUMENTS

| 5,914,168 A | 6/1999 | Wakamatsu et al. |
| 2005/0188769 A1 | 9/2005 | Moelkner et al. |

FOREIGN PATENT DOCUMENTS

| EP | 0725392 | 8/1996 |
| JP | S51-055991 | 5/1976 |
| JP | H05-080070 | 3/1993 |
| JP | H05-223516 | 8/1993 |
| JP | H06-300649 | 10/1994 |
| JP | H07-113697 | 5/1995 |
| JP | H08-102163 | 4/1996 |
| JP | H09-016941 | 1/1997 |

(Continued)

OTHER PUBLICATIONS

International Search Report for PCT/JP2019/014479 dated Jun. 25, 2019.

*Primary Examiner* — Lisa M Caputo
*Assistant Examiner* — Nigel H Plumb
(74) *Attorney, Agent, or Firm* — IPUSA, PLLC

(57) ABSTRACT

A strain gauge includes a flexible resin substrate, and a functional layer formed of a metal, an alloy, or a metal compound, on one surface of the substrate. The strain gauge includes a resistor formed as a film containing Cr, CrN, and $Cr_2N$, on one surface of the functional layer. The strain gauge includes an insulating layer formed of an inorganic material, the resistor being coated with the insulating layer. The strain gauge includes an insulating resin layer formed of an organic material, the insulating layer being coated with the insulating resin layer.

5 Claims, 5 Drawing Sheets

(56) References Cited

FOREIGN PATENT DOCUMENTS

| | | |
|---|---|---|
| JP | 2007-173544 | 7/2007 |
| JP | 2015-031633 | 2/2015 |
| JP | 2016-074934 | 5/2016 |
| JP | 2016-136605 | 7/2016 |

STRAIN GAUGE WITH INCREASED RESISTOR PROTECTION

TECHNICAL FIELD

The present invention relates to a strain gauge.

BACKGROUND ART

A strain gauge is known to be attached to a measured object to detect strain of the measured object. The strain gauge includes a resistor for detecting strain, and as a resistor material, for example, material including Cr (chromium) or Ni (nickel) is used. For example, the resistor is formed on a substrate formed of an insulating resin and is coated with a protecting film or the like (see, for example, Patent document 1).

CITATION LIST

Patent Document

[Patent document 1] Japanese Unexamined Patent Application Publication No. 2016-74934

SUMMARY

However, when a layer that protects the resistor is not appropriately selected, there is a problem of the resistor being unable to be protected sufficiently.

In view of the point described above, an object of the present invention is to improve protective performance of a resistor with respect to a strain gauge including the resistor formed on or above a flexible substrate.

A strain gauge includes a flexible substrate; a resistor formed of material containing at least one from among chromium and nickel, on or above the substrate; an insulating layer formed of an inorganic material, the resistor being coated with the insulating layer; and an insulating resin layer formed of an organic material, the insulating layer being coated with the insulating resin layer.

Effects of the Invention

According to the disclosed technique, with respect to a strain gauge including a resistor formed on or above a flexible substrate, protective performance of the resistor can be improved.

DESCRIPTION OF EMBODIMENTS

One or more embodiments will be hereinafter described with reference to the drawings. In each figure, the same numerals denote the same components; accordingly, duplicative explanations may be omitted.

First Embodiment

Figure 1:
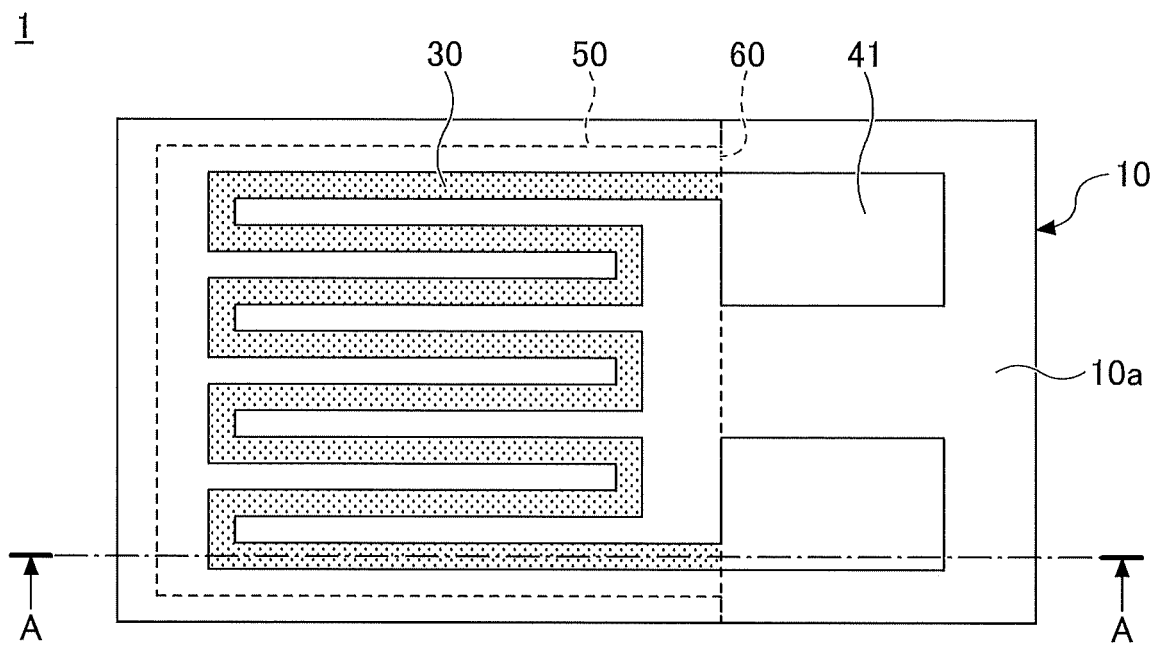
FIG. 1 is a plan view of an example of a strain gauge according to a first embodiment.
Figure 2:
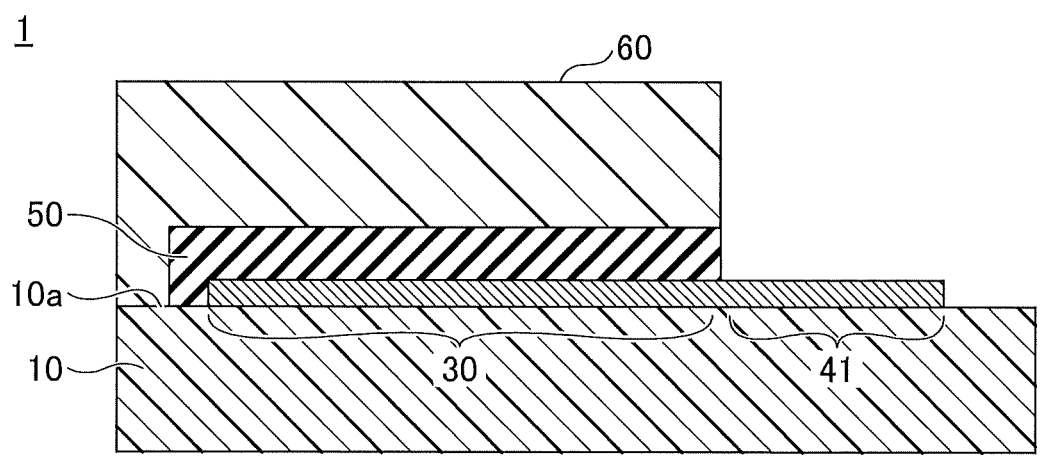
FIG. 2 is a cross-sectional view (part 1) of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates the cross section taken along the A-A line in FIG. 1. Referring to FIGS. 1 and 2, the strain gauge 1 includes a substrate 10, a resistor 30, terminal sections 41, an insulating layer 50, and a cover layer 60.

Note that in the present embodiment, for the sake of convenience, with respect to the strain gauge 1, the side of the substrate 10 where the resistor 30 is provided is referred to as an upper side or one side; and the side of the substrate 10 where the resistor 30 is not provided is referred to as a lower side or another side. Further, for each component, the surface on the side where the resistor 30 is provided is referred to as one surface or an upper surface; and the surface on the side where the resistor 30 is not provided is referred to as another surface or a lower surface. However, the strain gauge 1 can be used in a state of being upside down, or be disposed at any angle. Further, a plan view means that an object is viewed from a direction normal to an upper surface 10a of the substrate 10, and a planar shape refers to a shape of an object when viewed from the direction normal to the upper surface 10a of the substrate 10.

The substrate 10 is a member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of strain transfer from a flexure element surface that is bonded to a lower surface of the substrate 10 via an adhesive layer or the like; and dimensional stability with respect to environment, and when the thickness is 10 μm or more, it is further preferable in terms of insulation.

The substrate 10 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

The resistor 30 is a thin film formed on the substrate 10 and in a predetermined pattern, and is a sensitive section where resistance varies according to strain. The resistor 30 may be formed directly on the upper surface 10a of the substrate 10, or be formed above the upper surface 10a of the substrate 10, via other layer(s). Note that in FIG. 1, for the sake of convenience, the resistor 30 is illustrated in a crepe pattern.

The resistor 30 can be formed of, for example, material including Cr (chromium); material including Ni (nickel); or material including both of Cr and Ni. In other words, the resistor 30 can be formed of material including at least one from among Cr and Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide.

The thickness of the resistor 30 is not particularly restricted, and can be appropriately selected for any purpose. The thickness can be, for example, approximately between 0.05 µm and 2 µm. In particular, when the thickness of the resistor 30 is 0.1 µm or more, it is preferable in terms of improvement in crystallinity (e.g., crystallinity of α-Cr) of a crystal that, constitutes the resistor 30, and when the thickness of the resistor 30 is 1 µm or less, it is further preferable in terms of reduction in cracks of a given film caused by internal stress of the film that constitutes the resistor 30, or reduction in warp in the substrate 10.

For example, when the resistor 30 is the Cr composite film, the resistor is formed with α-Cr (alpha-chromium) as the main component having a stable crystalline phase, so that stability of the gauge characteristics can be improved. Additionally, when the resistor 30 is formed with α-Cr as the main component, a gauge factor of the strain gauge 1 can be 10 or more, as well as a gauge factor temperature coefficient TCS and temperature coefficient of resistance TCR being able to be each in the range of from −1000 ppm/° C. to 1000 ppm/° C. Here, a main component means that a target substance is 50% by weight or more of total substances that constitute the resistor. The resistor 30 preferably includes α-Cr at 80% by weight or more, from the viewpoint of improving the gauge characteristics. Note that α-Cr is Cr having a bcc structure (body-centered cubic structure).

The terminal sections 41 respectively extend from both end portions of the resistor 30 and are each wider than the resistor 30 to be formed in an approximately rectangular shape, in a plan view. The terminal sections 41 are a pair of electrodes from which a change in a resistance value of the resistor 30 according to strain is output externally, where, for example, a lead wire for an external connection, or the like is joined. For example, the resistor 30 extends from one of the terminal sections 41, with zigzagged hairpin turns, to be connected to another terminal section 41. The upper surface of each terminal section 41 may be coated with a metal allowing for greater solderability than the terminal section 41. Note that for the sake of convenience, the resistor 30 and the terminal sections 41 are expressed by different numerals. However, the resistor and the terminal sections can be integrally formed of the same material, in the same process.

The insulating layer 50 is provided on and above the upper surface 10a of the substrate 10, such that the resistor 30 is coated and the terminal sections 41 are exposed. The insulating layer 50 is formed of an inorganic material. Examples of the insulating layer 50 include an oxide, a nitride, or an oxynitride of a metal such as Cu, Cr, Ni, Al, Fe, W, Ti, Ta, or of an alloy including any of the metals described above. As the material of the insulating layer 50, a semiconductor such as Si or Ge; an oxide of the semiconductor material described above; a nitride of the semiconductor material; or an oxynitride of the semiconductor material may be used. The thickness of the insulating layer 50 is not particularly restricted, and can be appropriately selected for any purpose. For example, the thickness can be approximately between 0.01 µm and 2 µm.

The cover layer 60 is an insulating resin layer provided on and above the upper surface 10a of the substrate 10, such that the insulating layer 50 is coated. For example, the cover layer 60 can be provided such that a portion of the side surface of the insulating layer 50 and the upper surface of the insulating layer 50 are coated. Note that the cover layer 60 may be provided to cover all portions except for the terminal sections 41.

The cover layer 60 is formed of an insulating organic material. Examples of the material of the cover layer 60 include a PI resin; an epoxy resin; a PEEK resin; a PEN resin; a PET resin; a PPS resin; a polyethylene (PE) resin; a polyvinylidene chloride (PVDC) resin; a polyvinylidene fluoride (PVDF) resin; a polytetrafluoroethylene (PTFE) resin; a polypropylene (PP) resin; butyl rubber; silicone rubber; a composite resin (for example, a silicone resin, a polyolefin resin); and the like. The cover layer 60 may contain fillers or pigments. The thickness of the cover layer 60 is not particularly restricted, and can be appropriately selected for any purpose. For example, the thickness may be approximately between 2 µm and 30 µm.

As described above, when the resistor 30 is coated with the insulating layer 50 formed of an inorganic material, the resistor 30 can be prevented from being corroded due to moisture or oxygen in environments. Further, when the insulating layer 50 is coated with the flexible cover layer 60 formed of an organic material, mechanical damage, and the like can be prevented from occurring in the resistor 30. When the insulating layer 50 is coated with the cover layer 60, the effect of preventing corrosion of the resistor 30 due to moisture or oxygen in environments can be further enhanced. Further, when the insulating layer 50 is coated with the cover layer 60 heat resistance can be increased.

In particularly, when an oxide of Si is used as the material of the insulating layer 50, and butyl rubber is used as the material of the cover layer 60, it is preferable in terms of the effect of moisture barrier characteristics being increasingly obtained.

Figure 3A:
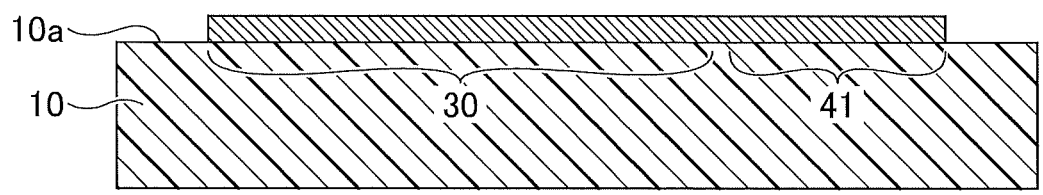
FIG. 3A is a diagram (part 1) illustrating an example of manufacturing the strain gauge according to the first embodiment.
Figure 3B:
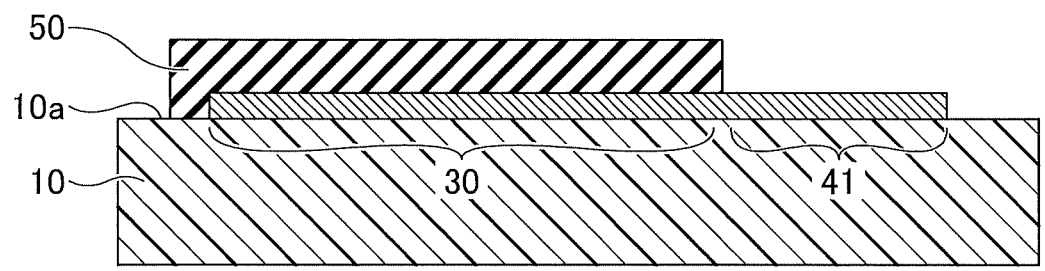
FIG. 3B is a diagram (part 2) illustrating an example of manufacturing the strain gauge according to the first embodiment.
Figure 3C:
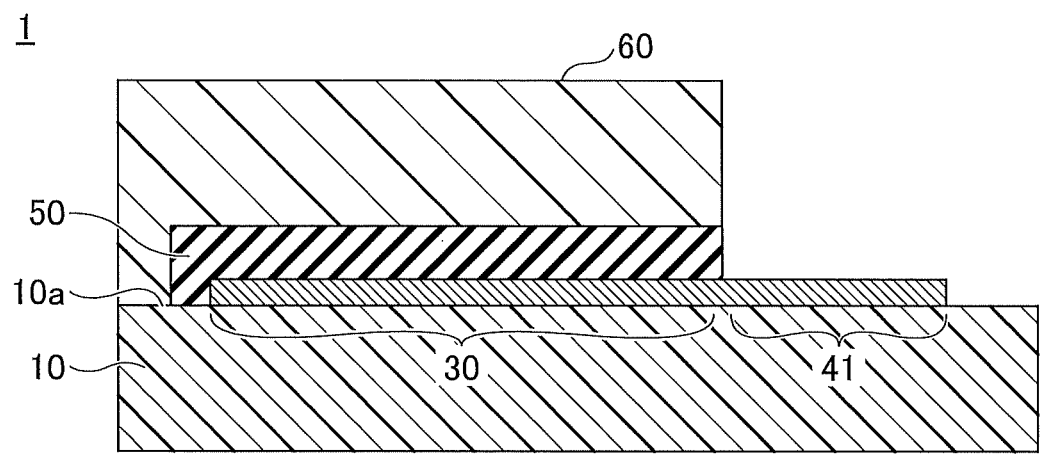
FIG. 3C is a diagram (part 3) illustrating an example of manufacturing the strain gauge according to the first embodiment.

FIG. 3A to FIG. 3C are diagrams illustrating an example of manufacturing the strain gauge according to the first embodiment, and each illustrate the cross section corresponding to FIG. 2.

In order to manufacture the strain gauge 1, first in the process illustrated in FIG. 3A, the substrate 10 is prepared and the resistor 30 and the terminal sections 41 each of which has the planar shape illustrated in FIG. 1 are formed on the upper surface 10a of the substrate 10. The material and thickness for each of the resistor 30 and the terminal sections 41 are the same as the material and thickness described above. The resistor 30 and the terminal sections 41 can be integrally formed of the same material.

The resistor 30 and the terminal sections 41 are formed, for example, such that a raw material capable of forming the resistor 30 and the terminal sections 41 is a target to be deposited by magnetron sputtering, and such that patterning is performed by photolithography. Instead of magnetron sputtering, the resistor 30 and the terminal sections 41 may be deposited by reactive sputtering, vapor deposition, arc ion plating, pulsed laser deposition, or the like.

From the viewpoint of stabilizing the gauge characteristics, before depositing the resistor 30 and the terminal sections 41, preferably, as a base layer, a functional layer having a film thickness that is approximately between 1 nm and 100 nm is vacuum-deposited on the upper surface 10a of the substrate 10, by conventional sputtering, for example Note that, after forming the resistor 30 and the terminal sections 41 on the entire upper surface of the functional layer, the functional layer, as well as the resistor 30 and the terminal sections 41, are patterned in the planar shape illustrated in FIG. 1, by photolithography.

In the present application, the functional layer refers to a layer that has a function of promoting crystal growth of the resistor 30 that is at least an upper layer. The functional layer preferably further has a function of preventing oxidation of the resistor 30 caused by oxygen and moisture included in the substrate 10, as well as a function of improving adhesion between the substrate 10 and the resistor 30. The functional layer may further have other functions.

The insulating resin film that constitutes the substrate 10 contains oxygen and moisture. In this regard, particularly when the resistor 30 includes Cr it is effective for the functional layer to have a function of preventing oxidation of the resistor 30, because Cr forms an autoxidized film.

The material of the functional layer is not particularly restricted as long as it is material having a function of promoting crystal growth of the resistor 30 that is at least an upper layer. Such material can be appropriately selected for any purpose, and includes one or more types of metals selected from the group consisting of, for example, Cr (chromium), Ti (titanium), V (vanadium), Mb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium) Rh (rhodium), Re (rhenium), Os (osmium), Ir (iridium) Pt (platinum), Pd (palladium), Ag (silver), Au (gold) Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and in which an Ar (argon) gas is supplied to a chamber. By using conventional sputtering, the functional layer is deposited while the upper surface 10a of the substrate 10 is etched with Ar. Thus, a deposited amount of film of the functional layer is minimized and thus an effect of improving adhesion can be obtained.

However, this is an example of a method of depositing the functional layer, and the functional layer may be formed by other methods. For example, as such a method, before depositing the functional layer, the upper surface 10a of the substrate 10 is activated by plasma treatment using Ar, etc. or the like to thereby obtain the effect of improving the adhesion; subsequently, the functional layer may be vacuum-deposited by magnetron sputtering.

A combination of the material of the functional layer and the material of the resistor 30 and the terminal sections 41 is not particularly restricted, and can be appropriately selected for any purpose. For example, Ti is used for the functional layer, and a Cr composite film formed with α-Cr (alpha-chromium) as the main component can be deposited as the resistor 30 and the terminal sections 41.

In this case, each of the resistor 30 and the terminal sections 41 can be deposited by, for example, magnetron sputtering in which a raw material capable of forming the Cr composite film is the target and in which an Ar gas is supplied to a chamber. Alternatively, the resistor 30 and the terminal sections 41 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer formed of Ti, and a Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR being able to be each in the range of from −1000 ppm/° C. to +1000 ppm/° C. Note that, when the functional layer is formed of Ti, the Cr composite film may include Ti or TiN (titanium nitride).

Note that when the resistor 30 is a Cr composite film, the functional layer formed of Ti includes all functions of a function of promoting crystal growth of the resistor 30; a function of preventing oxidation of the resistor 30 caused by oxygen or moisture contained in the substrate 10; and a function of improving adhesion between the substrate 10 and the resistor 30. Instead of Ti, when the functional layer is formed of Ta, Si, Al, or Fe, the functional layer also includes the same functions.

As described above, with the functional layer being provided in the lower layer of the resistor 30, the crystal growth of the resistor 30 can be promoted and thus the resistor 30 having a stable crystalline phase can be fabricated. As a result, with respect to the strain gauge 1, the stability of the gauge characteristics can be improved. Also, the material that constitutes the functional layer is diffused into the resistor 30, so that the gauge characteristics of the strain gauge 1 can be thereby improved.

Then, in the process illustrated in FIG. 3B, the insulating layer 50 with which the resistor 30 is coated and that exposes the terminal sections 41 is formed on and above the upper surface 10a of the substrate 10. The material and thickness of the insulating layer 50 are the same as the material and thickness described above. A method of forming the insulating layer 50 is not particularly restricted, and can be appropriately selected for any purpose. For example, after film deposition by a vacuum process such as sputtering, plating, or chemical vapor deposition (CVD), or, a solution process such as spin coating or a sol-gel process, a method of being patterned by photolithography is used.

Then, in the process illustrated in FIG. 3C, the cover layer 60 with which the insulating layer 50 is coated and that exposes the terminal sections 41 is formed on and above the upper surface 10a of the substrate 10. The material and thickness of the cover layer 60 are the same as the material and thickness described above. For example, the cover layer 60 can be fabricated, such that a thermosetting insulating resin film in a semi-cured state is laminated on the upper surface 10a of the substrate 10, and such that the insulating layer 50 is coated therewith and the terminal sections 41 are exposed; subsequently, heat is added and curing is performed. The cover layer 60 may be fabricated, such that a thermosetting insulating resin that is liquid or paste-like is applied to the upper surface 10a of the substrate 10, and such that the insulating layer 50 is coated therewith and the terminal sections 41 are exposed; subsequently, heat is added and curing is performed. In the process described above, the strain gauge 1 is completed.

Figure 4:
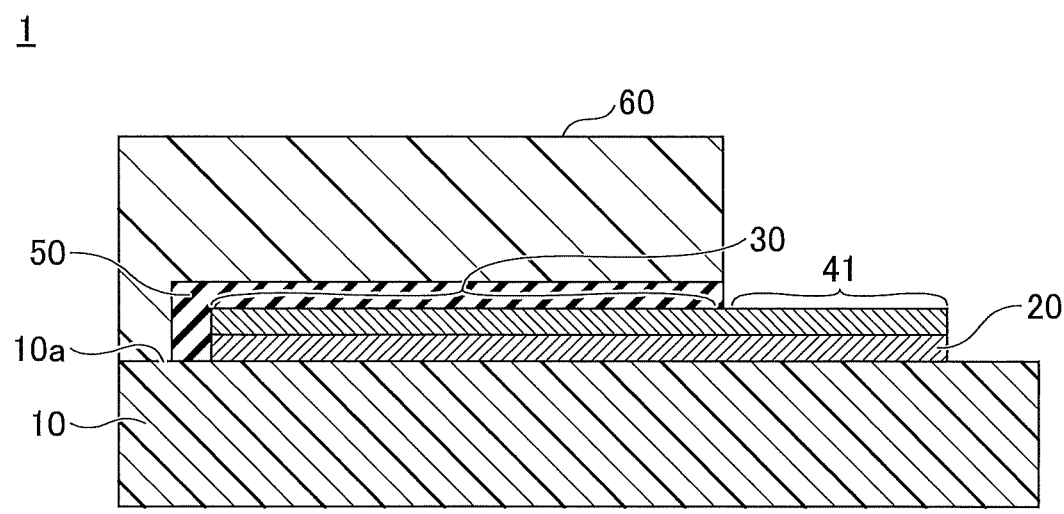
FIG. 4 is a cross-sectional view (part 2) of an example of the strain gauge according to the first embodiment.

Note that when the functional layer, as a base layer of the resistor 30 and the terminal sections 41, is provided on the upper surface 10a of the substrate 10, the strain gauge 1 has the cross-section shape illustrated in FIG. 4. A layer expressed by the numeral 20 indicates the functional layer. The planar shape of the strain gauge 1 in the case of providing the functional layer 20 is the same as that in FIG. 1.

Second Embodiment

The second embodiment will be described using an example of the strain gauge in which each electrode has a laminated structure. Note that in the second embodiment, explanation for the same component as having been described in the embodiment may be omitted.

Figure 5:
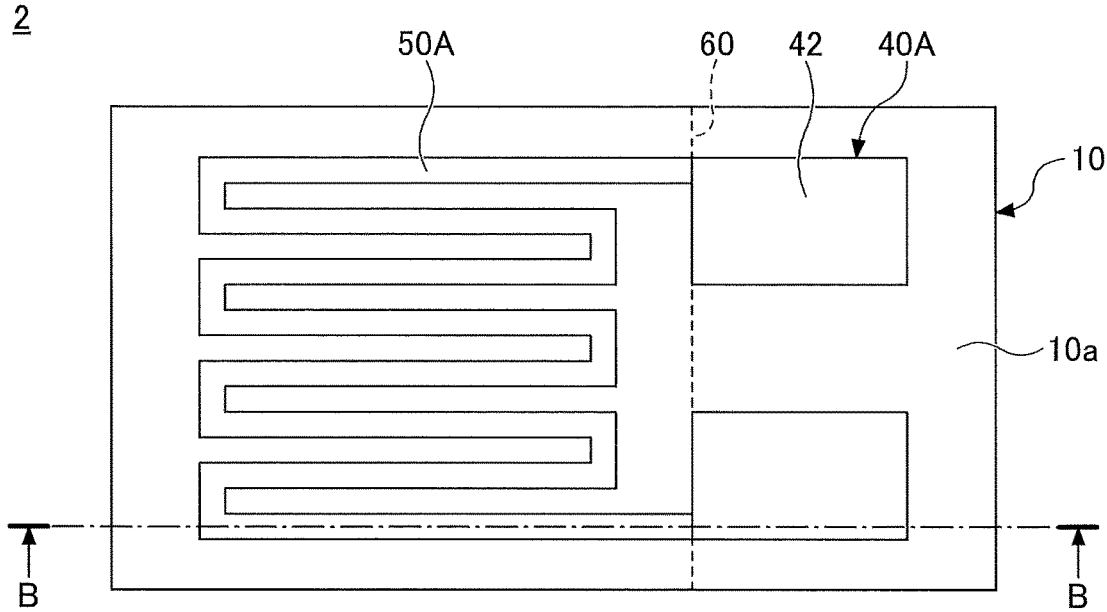
FIG. 5 is a plan view of an example of a strain gauge according to a second embodiment.
Figure 6:
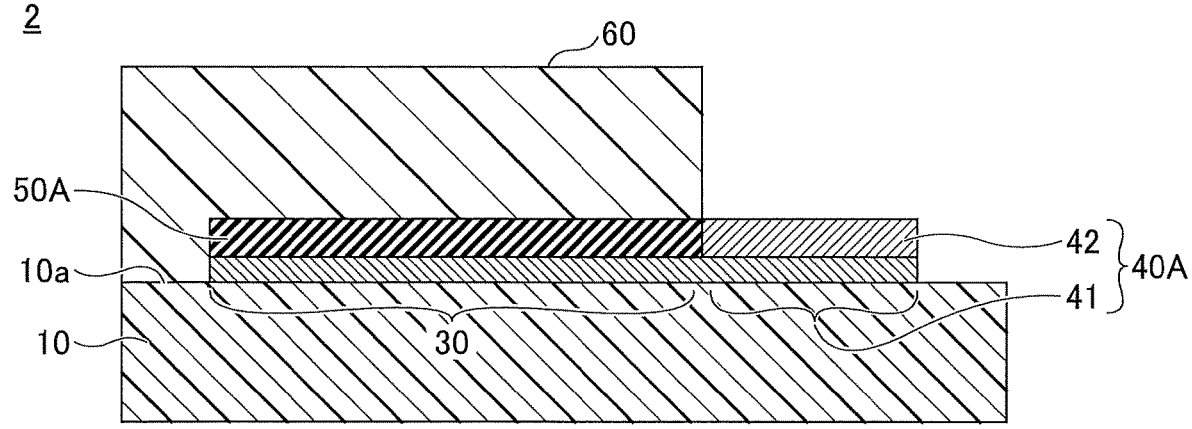
FIG. 6 is a cross-sectional view of an example of the strain gauge according to the second embodiment.

FIG. 5 is a plan view of an example of the strain gauge according to the second embodiment. FIG. 6 is a cross-sectional view of an example of the strain gauge according to the second embodiment, and illustrates the cross section taken along the B-B line in FIG. 5. Referring to FIG. 5 and FIG. 6, the strain gauge 2 differs from the strain gauge 1 (see FIG. 1 and the like) in that electrodes 40A and an insulating layer 50A are provided.

Each electrode 40A has a laminated structure in which a plurality of metallic, layers are laminated. Specifically, each electrode 40A includes a given terminal section 41 extending from a corresponding end portion from among both end portions of the resistor 30; and a metallic layer 42 formed on the upper surface of the terminal section 41. The material of the metallic layer 42 is not particularly restricted, and can be appropriately selected for any purpose. For example, a metal (for example, Cu (copper)) allowing for greater solderability than the terminal section 41 can be used. The thickness of the metallic layer 42 is not particularly restricted, and can be appropriately selected for any purpose. For example, the thickness can be approximately between 0.01 μm and 1 μm. Note that a layer formed of a metal different from the metallic layer 42 such as a nickel layer or a gold layer may be further laminated on the metallic layer 42.

The insulating layer 50A is provided on the upper surface of the resistor 30. The insulating layer 50A is formed of an inorganic material. Specifically, the insulating layer 50A is an oxide film of a metal that constitutes the metallic layer 42. For example, when the material of the metallic layer 42 is Cu (copper), the material of the insulating layer 50A is CuO (copper oxide). The thickness of the insulating layer 50A is approximately the same as the thickness of the metallic layer 42.

Figure 7A:
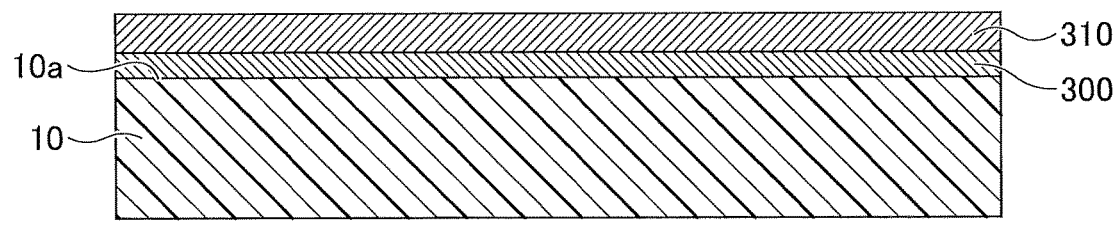
FIG. 7A is a diagram (part 1) illustrating an example of manufacturing the strain gauge according to the second embodiment.

FIG. 7A to FIG. 1C illustrate the process of manufacturing the strain gauge according to the second embodiment, and illustrate the cross section corresponding to FIG. 6. In order to manufacture the strain gauge 2, first, in the process illustrated in FIG. 7A, the substrate 10 is prepared and a metallic layer 300 that finally becomes the resistor 30 and the terminal sections 41 is formed on the entire upper surface 10a of the substrate 10. The material and thickness of the metallic layer 300 are the same as the material and thickness of the resistor 30 described above.

The metallic layer 300 can be deposited by magnetron sputtering in which, for example, a raw material capable of forming the metallic layer 300 is the target. Instead of the magnetron sputtering, the metallic layer 300 may be deposited by reactive sputtering, vapor, deposition, arc ion plating, pulsed laser deposition, or the like.

As in the first embodiment, from the viewpoint of stabilizing the gauge characteristics, before depositing the metallic layer 300, as a base layer, the functional layer having a film thickness that is approximately between 1 nm and 100 nm is preferably vacuum-deposited on the upper surface 10a of the substrate 10, by conventional sputtering, for example.

Then, a metallic layer 310 that finally becomes the insulating layer 50A and the metallic layer 42 is formed on the upper surface of the metallic layer 300 by for example, sputtering, plating, or the like. The material and thickness of the metallic layer 310 are the same as the material and thickness of the metallic layer 42 described above.

Figure 7B:
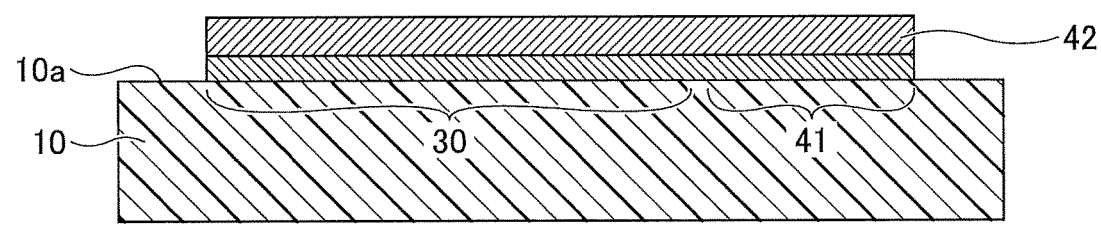
FIG. 7B is a diagram (part 2) illustrating an example of manufacturing the strain gauge according to the second embodiment.

Then, in the process illustrated in FIG. 7B, the metallic layers 300 and 310 are patterned by photolithography to have the planar shape in FIG. 5. A pattern in which the metallic layer 42 is laminated on the resistor 30 and the terminal sections 41 is formed.

Figure 7C:
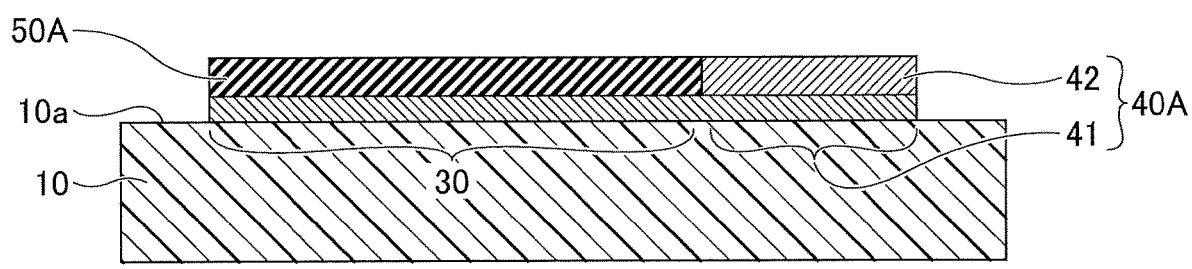
FIG. 7C is a diagram (part 3) illustrating an example of manufacturing the strain gauge according to the second embodiment.

Then, in the process illustrated in FIG. 7C, the metallic layer 42 except for a portion that constitutes each electrode 40A is heated to be oxidized, so that the insulating layer 50A formed of an oxide film of a metal constituting the metallic layer 42 is formed.

After the process illustrated in FIG. 7C, the cover layer 60 is formed as in the process in FIG. 3C so that the strain gauge 2 illustrated in FIG. 5 and FIG. 6 is completed.

As described above, the insulating layer 50A may be formed of an oxide film of the metallic layer 42 constituting the electrodes 40A. In this case as well, the same effect as described in the first embodiment is obtained.

The preferred embodiments and the like have been described above in detail, but are not limited thereto. Various modifications and alternatives to the above embodiments and the like can be made without departing from a scope set forth in the claims.

This International application claims priority to Japanese Patent Application No. 2018-071762, filed Apr. 3, 2018, the contents of which are incorporated herein by reference in their entirety.

REFERENCE SIGNS LIST 1, 2 strain gauge, 10 substrate, 10a upper surface, 20 functional layer, 30 resistor, 40A electrode, 41 terminal section, 42 metallic layer, 50, 50A insulating layer, 60 cover layer

The invention claimed is:
1. A strain gauge comprising:
a flexible resin substrate;
a functional layer formed of a metal, an alloy, or a metal compound, on one surface of the substrate;
a resistor formed as a film containing Cr, CrN, and $Cr_2N$, on one surface of the functional layer;
an insulating layer formed of an inorganic material, the resistor being coated with the insulating layer; and
an insulating resin layer formed of an organic material, the insulating layer being coated with the insulating resin layer.
2. The strain gauge according to claim 1, further comprising electrodes electrically connected to the resistor,
wherein each electrode includes:

a terminal section extending from a given end portion of the resistor; and a metallic layer formed on the terminal section, wherein the insulating layer is an oxide film of a metal that constitutes the metallic layer.

3. The strain gauge according to claim 1, wherein a main component of the resistor is alpha-chromium.

4. The strain gauge according to claim 3, wherein the resistor includes alpha-chromium at 80% by weight or more.

5. The strain gauge according to claim 1, wherein the functional layer includes a function of promoting crystal growth of the resistor.

\* \* \* \* \*